Milton P. Laurent
INVENTOR.
Lester B. Clark
& Ray L. Smith
ATTORNEYS

Jan. 27, 1953   M. P. LAURENT   2,626,840
SELF-TIGHTENING PACKING GLAND

Filed Jan. 28, 1948   2 SHEETS—SHEET 2

MILTON P. LAURENT
INVENTOR.

BY Lester B. Clark
& Ray L. Smith
ATTORNEYS

Patented Jan. 27, 1953

2,626,840

UNITED STATES PATENT OFFICE 2,626,840

SELF-TIGHTENING PACKING GLAND

Milton P. Laurent, Houston, Tex.

Application January 28, 1948, Serial No. 4,737

5 Claims. (Cl. 308—36.3)

The invention relates to a packing gland and in particular to a packing gland which is self-tightening to maintain a fluid seal between the relatively movable parts thereof.

An object of the invention is to provide a packing gland which compensates for wear of the relatively movable parts to maintain a seal therebetween.

Another object of the invention is to provide a pressure packing gland which has seal means deformable by fluid pressure to form a sealing engagement between the relatively movable parts to compensate for wear thereof.

Still another object of the invention is to provide a packing gland which comprises a minimum number of parts to compensate for wear to maintain a seal therein as the parts tend to leak.

Another object of the invention is to provide in a self-tightening packing gland deformable seal means which retain the deformation imposed upon them to maintain a sealing engagement between the relatively movable parts to compensate for wear thereof.

A further object of the invention is to provide a packing gland of simple construction with a minimum number of moving parts to maintain a seal between the relatively movable parts as such parts wear.

A still further object of the invention is to provide in a self-tightening packing gland, seal means which are deformable by fluid pressure to maintain a seal between relatively movable parts thereof as wear occurs between such parts and the gland tends to leak.

A further object of the invention is to provide a self-tightening packing gland which can be easily manufactured and readily assembled for operation.

A still further object of the invention is to provide a packing gland which can be readily resealed with a pressure fluid to accomplish movement between the relatively movable parts to maintain a seal therebetween.

A further object is to provide in a packing gland seal means which retain a deformation imposed thereupon by fluid pressure to maintain a seal in the gland.

Other and further objects of the invention will become more readily apparent from a consideration of the following description and drawings wherein.

Figure 1:
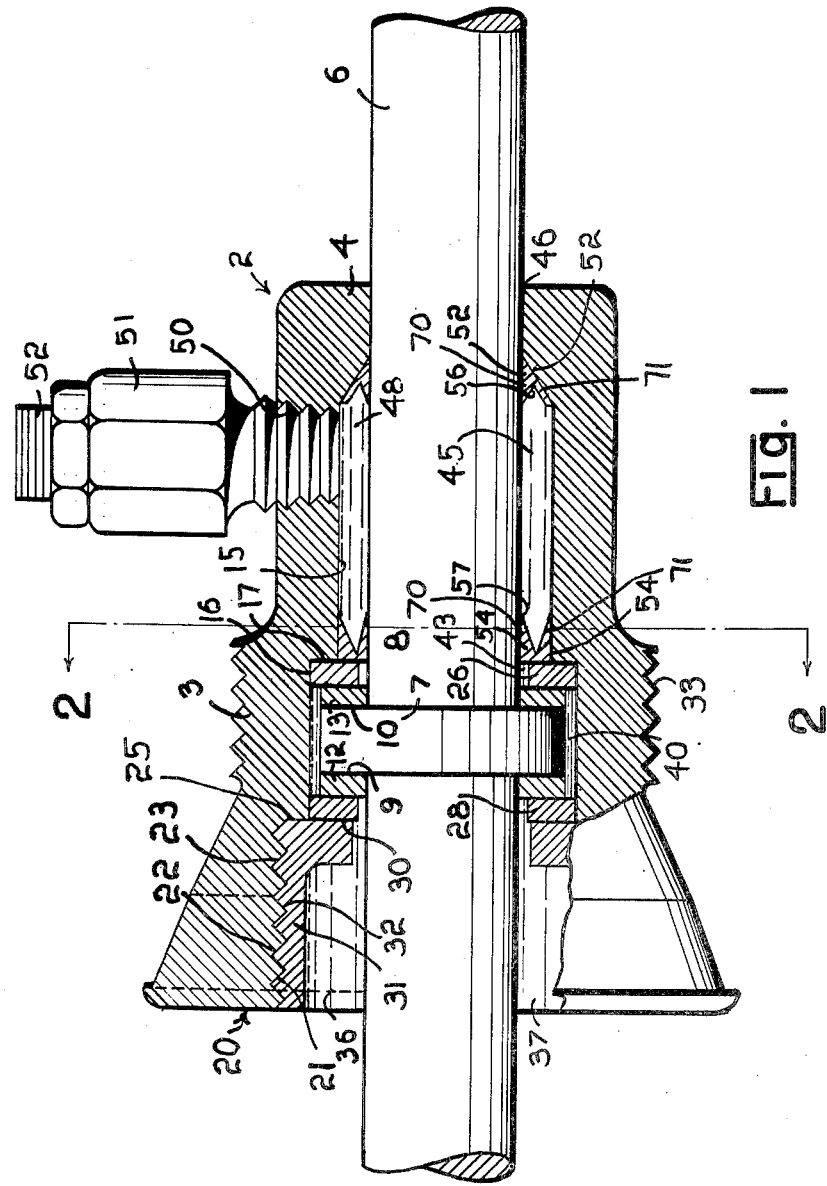
Fig. 1 illustrates a general arrangement of a construction of the packing gland in a vertical, sectional view.
Figure 2:
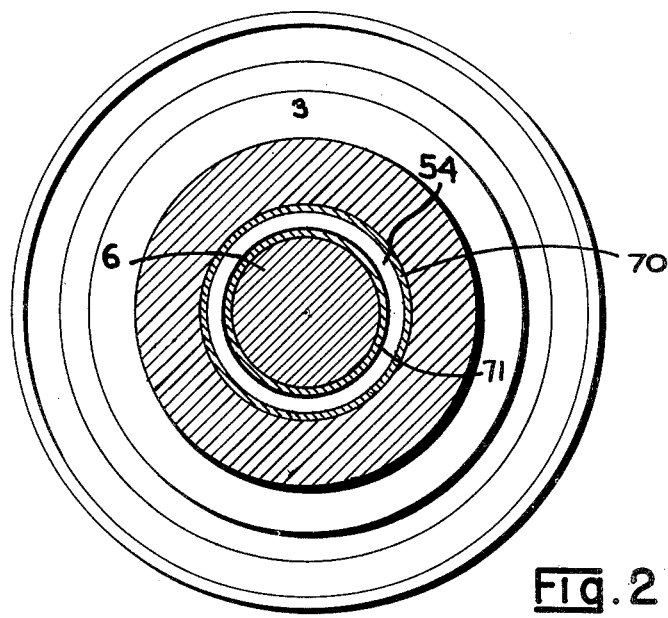
Fig. 2 is a sectional view taken on the line 2—2 of Fig. 1 and more clearly illustrates the general arrangement of the invention.

A packing gland is shown at 2 as comprising the hollow housing member 3 which has a closed end 4. A shaft or rod 6 extends through the housing 3 and the closed end 4 thereof, and is movably mounted in such housing. On the shaft or rod 6 within the housing 3 there may be annular shoulder 7 outstanding on the periphery 8 of the shaft.

Adjacent the sides 9 and 10 of the shoulder 7 and fitting in the housing 3 are a pair of thrust washers 12 and 13, respectively, arranged to receive the thrust load on the shaft 6. The hollow housing member 3 is bored at 15 and is counter bored at 16, such counter bore being of a slightly wider diameter than the bore 15, whereby the shoulder 17 in the housing member is formed.

Adjacent the open end 20 of the hollow housing member 3, threads 21 are provided on the inner periphery 22 of a second counter bore 23 which is of a slightly wider diameter than the counter bore 16, whereby the shoulder 25 in the housing 3 is formed.

Adjacent the shoulder 17 is a thrust washer 26 which is arranged to contact the washer 13 mounted on the shaft or rod 6, whereby the thrust load may be transmitted to the washer 26 and thence to the surrounding housing 3.

Adjacent the thrust washer 12 on the other side of the annular shoulder 7, is a thrust washer 28 adjacent the inner end 30 of the retainer nut 31. The retainer nut 31 is provided with threads 32 for engagement with the threads 21 in the hollow housing member 3 to position the retainer nut in the housing. When the retainer nut is positioned in place in the hollow housing member 3, the thrust washer 28 will contact the thrust washer 12 mounted on the rotatable shaft. The shaft 6 is, therefore, firmly positioned in the housing by the thrust washers 12, 13, 26 and 28, which washers are in turn retained in position by the retainer nut 31. Any axial load onto the shaft will be transmitted to the housing 3 through the thrust washers 12 and 13, 26 and 28.

The hollow housing member 3 is provided with threads 33 on the outer surface thereof, whereby the whole unit may be positioned in place on the assembly on which it is to be used. The assembly on which the packing gland is mounted will, of course, be provided with a lubricant internally thereof to lubricate the moving parts and since the packing gland is mounted on and integral with this assembly this internal lubricant denoted as 36 in Fig. 1 will fill the space about the shaft 6 adjacent the retainer nut 31 in the housing 3.

During the continued operation of the assembly the internal lubricant 36 will gradually leak past the thrust washers 28 and 12 to fill the chambers or reservoir 40 in the counter bore 16 adjacent the annular shoulder 7 on the rod or shaft 6. The lubricant 36 will further pass between the thrust washer 13 and 26 to fill the space 43 between the thrust washer 26 and the shaft 6.

Such lubricant will further tend to pass into the chamber 45 in the counter bore 15 and outwardly past the shaft at 46 in the closed end 4 of the housing member.

To prevent leakage of the lubricant from the space 43 and into the chamber 45 and out of the packing gland there is adjacent the end of the chamber 45, a ring 52 of deformable sealing material, such as lead or the like which takes a definite set after being formed. Similarly adjacent and fitting against the thrust washer 26 is a ring 54 of deformable material, such as lead or the like. The sides of the rings 52 and 54 facing the chamber 45 are provided with a groove 56 and 57 respectively, substantially V-shaped. This cut on the surface of the rings facing the chamber 45 forms the lips 70 and 71 on each of such rings. The lips 70 extend along the shaft 6 while the lips 71 extend along the inner wall of the housing.

In order to maintain a seal between the shaft 6 and each of the seal rings 52 and 54, a pressure fluid is injected into the chamber 45 through the fitting 51 so as to expand and deform the lips 70 and 71 thereof to form a seal with the shaft 6 and the housing 3. Due to the fact that the seal rings are of deformable material such as lead or the like, which retain the deformation imposed upon them, the pressure of the fluid may then be lessened and the operation of the assembly with the packing gland thereon continued.

The packing gland then continues to operate until the relatively movable parts of the gland have worn so that the lubricant 36 again begins to leak into the chamber 45. The chamber 45 may then be subjected to an additional charge of pressure fluid which will reform the seal rings 52 and 54 so as to expand the lips 70 and 71 thereof to form a fluid seal between the lip 70 and the shaft 6 and between the lip 71 and the housing 3. The deformation of the seal rings 52 and 54 will compensate for any wear occurring between the rotatable shaft 6 and the stationary parts of the packing gland.

The pressure fitting 51 is mounted in the opening 50 in the housing 3. The outer end of the pressure fitting is provided with threads at 52 by which a hose or other suitable means may be connected thereto and fluid pressure injected into the housing therethrough.

Figure 3:
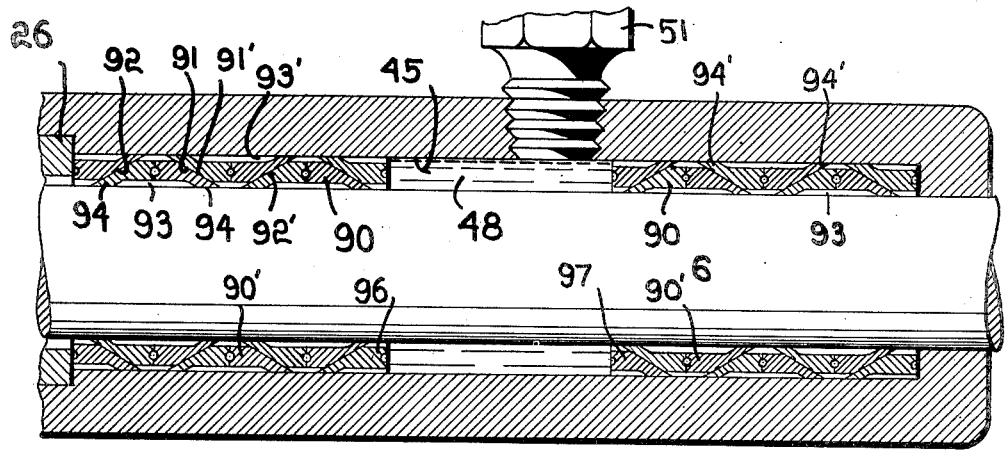
Fig. 3 shows an alternate embodiment of the packing means associated with the invention.

In Fig. 3 an alternate form of the seal rings is shown disposed in the chamber 45. Such seal rings comprise a plurality of rings 90 of deformable material which takes a definite set after deformation. These rings 90 are provided with tapered sides 91 and 92 and 91' and 92' respectively. The tapers may be of any suitable degree and it is to be noted that the tapers 91 and 91' are complementary while the tapers 92 and 92' are also complementary, so that when the rings 90 are positioned in the chamber 45 they fit closely adjacent each other. Undercut portions 93 and 93' on the rings 90 are provided on the side with the greatest width. The undercut extends substantially the entire width of the ring but terminates somewhat short of each end whereby annular legs 94 and 94' are formed on the rings 90 and 90' respectively. The annular legs 94 of the ring 90 fit against the shaft 6, while the legs 94' fit against the inner wall of the housing 3.

A pressure fluid may be injected into the chamber 45 to deform the rings 90 to maintain a seal between the housing 3 and between the rings and the shaft 6. The pressure of the fluid may then be lessened since the rings will retain the deformation imposed upon them and will maintain a seal in the packing gland.

As wear occurs between the annular legs 94 and the shaft 6 the internal lubricant will attempt to leak into the chamber 45 and out of the housing 3.

The seal rings may then be reformed by a charge of pressure fluid in order to maintain a seal between the rings and the shaft 6 and housing 3.

While the rings may be formed of various suitable materials, it has been found that the most desirable results are obtained with Chrysler Oilite brass or with lead.

Broadly the invention contemplates packing gland, operable by fluid pressure to maintain a seal between the relatively movable parts as wear occurs on such parts.

What is claimed is:

1. A self-tightening packing gland comprising a hollow housing having one end thereof closed, a shaft movably mounted therethrough, an annular shoulder on said shaft, thrust washers mounted adjacent said shoulder and arranged to rotate with said shaft, thrust washers mounted in said housing arranged to contact said thrust washers on said shaft, a retainer nut secured in said housing to retain said shaft in position, there being a chamber formed around the shaft by said thrust washers mounted in said housing on the closed end of said housing, there being an opening through said housing and into said chamber, a pressure fitting in said opening, a pressure fluid in said chamber, deformable seal rings on said shaft adjacent said washers mounted in said housing and adjacent the closed end of said housing, said seal rings being deformable by the pressure fluid in said chamber to maintain a seal between said shaft and said washers and between said shaft and closed end.

2. A self-tightening packing gland comprising, a hollow housing having one end thereof closed, a shaft movably mounted therethrough, an annular shoulder on said shaft, a thrust surface thereon and a mating thrust surface in said housing, a retainer nut for retaining said shaft in position, there being a chamber in said housing surrounding said shaft, deformable rings mounted on said shaft adjacent the ends of said chamber, said rings being adapted to deform upon the application of a pressure fluid in said chamber to move said rings to a deformation which remains after the fluid pressure in the chamber is lessened to form a fluid sealing engagement with said shaft and end walls of the chamber to maintain a seal therebetween.

3. A self-tightening packing gland comprising a housing, a shaft movably mounted therethrough, a thrust surface thereon, and a mating thrust surface in said housing, there being a chamber in said housing surrounding said shaft to receive a pressure fluid therein, seal means on said shaft engaging said housing, said means being deformable by said pressure fluid to a deformation which remains after the fluid pressure in the chamber is lessened to maintain a seal between said housing and shaft.

4. In a packing gland, a housing having a chamber therein, a shaft movably mounted therethrough, a thrust washer on said shaft rotatable therewith, a thrust washer on said housing in abutting relation to said washer on said shaft, there being a pressure fluid in said chamber, means on said shaft engaging said housing expandable by said pressure fluid to retain said means in sealing engagement with said housing.

5. In a packing gland a housing, a shaft movably mounted therethrough, a thrust washer on said shaft rotatable therewith, a thrust washer on said housing in abutting relation to said washer on said shaft, there being a pressure fluid in said housing surrounding said shaft, means on said shaft comprising a deformable metal packing in sealing engagement with said housing, said means being expandable by the fluid pressure in said chamber to a deformation which remains after the fluid pressure in the chamber is lessened to maintain a seal between said shaft and housing.

MILTON P. LAURENT.

REFERENCES CITED

The following references are of record in the file of this patent:

UNITED STATES PATENTS

| Number | Name | Date |
| --- | --- | --- |
| 216,038 | Hewitt | June 3, 1879 |
| 351,828 | Bushnell | Nov. 2, 1886 |
| 528,773 | Ellis | Nov. 6, 1894 |
| 624,497 | Inglis | May 9, 1899 |
| 839,901 | Spring | Jan. 1, 1907 |
| 895,038 | Otto | Aug. 4, 1908 |
| 1,721,737 | Joyce | July 23, 1929 |
| 1,971,169 | Wheeler | Aug. 21, 1934 |
| 1,973,323 | Adams | Sept. 11, 1934 |
| 1,983,130 | Hermann | Dec. 4, 1934 |

FOREIGN PATENTS

| Number | Country | Date |
| --- | --- | --- |
| 261,867 | Great Britain | 1926 |